2,834,818

ALKYLATION OF SATURATED HYDROCARBONS

Louis Schmerling, Riverside, and Vladimir Haensel, Hinsdale, Ill., assignors to Universal Oil Products Company, Des Plaines, Ill., a corporation of Delaware No Drawing. Application December 16, 1955
Serial No. 553,410

20 Claims. (Cl. 260—666)

This invention relates to a process for the alkylation of saturated hydrocarbons in the presence of a novel catalyst. More particularly, this invention relates to the alkylation of an isoparaffinic hydrocarbon with an olefin-acting compound at alkylating conditions in the presence of an alkylation catalyst comprising a free alkali metal and a minor promoting amount of organic compound capable of reacting with a portion of said free alkali metal to form a metallized organic compound.

An object of this invention is to produce alkylated paraffin and cycloparaffin hydrocarbons and particularly to produce alkylated isoparaffin hydrocarbons. A specific object of this invention is the production of substantially saturated gasoline boiling range hydrocarbons having high antiknock values which may be utilized as such or as components of gasoline suitable for use in airplane and automobile engines.

Numerous catalysts have been proposed for the alkylation of paraffinic hydrocarbons with olefin-acting compounds including liquid catalysts such as sulfuric acid, phosphoric acid, fluorosulfonic acid, chlorosulfonic acid, hydrogen fluoride, etc. Similarly, solid catalysts such as aluminum chloride, aluminum bromide, metal oxides, metal sulfides, clays, etc. have been proposed. Each of the prior art catalysts suffers from at least one inherent disadvantage and it is a further object of this invention to provide an alkylation catalyst which overcomes each and all such disadvantages.

It will be noted that each of the above-mentioned prior art catalysts is a so-called "acid-acting" catalyst which catalysts have been utilized to yield products the formation of which has been explained by the carbonium ion mechanism. With any of the above acid-acting catalysts, the alkylation of isobutane with propylene leads mainly to the formation of 2,3-dimethylpentane and 2,4-dimethylpentane. The formation of these seven carbon atom products has been explained as occurring by rearrangement of a secondary 2,2-dimethylpentyl carbonium ion to the 2,3- and 2,4-dimethylpentyl carbonium ions which then extract a hydride ion from isobutane to form the hydrocarbon products of the reaction as well as tert-butyl carbonium ion which continues the chain reaction. The acid catalyzed alkylation of isobutane with propylene is illustrated by the following equations:

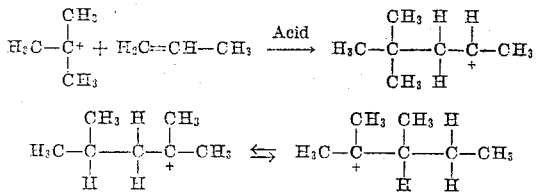

The 2,3- and 2,4-dimethylpentyl carbonium ions, respectively, react with isobutane to produce 2,3-dimethylpentane and 2,4-dimethylpentane and regenerate the tert-butyl carbonium ion which then again reacts with propylene as shown hereinabove.

In addition to acid catalyzed alkylation reactions, the prior art also discloses the thermal alkylation of isoparaffins with olefins. The thermal reaction of isobutane with propylene yields 2,2-dimethylpentane as the main product. In contrast to the acid catalyzed reactions discussed above, the thermal reaction is considered to be of the free radical type. Rearrangement of the intermediate heptyl free radical does not take place and therefore the 2,2-dimethylpentane is the main heptane isomer produced.

The seven carbon atom saturated hydrocarbon which has the highest octane number is 2,2,3-trimethylbutane, sometimes referred to in the art as triptane. Triptane is not produced, in any appreciable quantities, either by the acid catalyzed alkylation of isobutane with propylene or by the thermal alkylation of isobutane with propylene. It is an additional object of this invention to produce triptane in high yields by the utilization of a catalyst which is believed to be neither an acid type catalyst nor a free radical generating type catalyst. Further, since triptane is produced, a thermal reaction is not taking place under these conditions. In the alkylation reactions of isobutane with propylene discussed above, the tert-butyl carbonium ion or tert-butyl free radical always adds to the number one carbon atom of propylene. By utilization of the novel catalyst of this invention, it has been found that addition of isobutane can be made at the number two carbon atom of propylene thus yielding 2,2,3-trimethylbutane as the product. Similarly, when isobutane is alkylated with butene-1 in the presence of the novel catalyst composition of the present invention, the product is 2,2,3-trimethylpentane, a very desirable hydrocarbon constituent of automotive and aviation gasoline possessing a high antiknock value. The attainment of these objects and others can be accomplished by utilization of the process of the present invention, the details of which are set forth hereinafter.

In one embodiment the present invention relates to the alkylation of an alkylatable saturated hydrocarbon with an olefin-acting compound at alkylating conditions in the presence of a catalyst comprising a free alkali metal and a minor promoting amount of an organic compound capable of reacting with a portion of said free alkali metal to form a metallized organic compound.

Another embodiment of the present invention relates to the alkylation of an alkylatable acyclic paraffin hydrocarbon with an olefin-acting compound at alkylating conditions in the presence of a catalyst comprising a free alkali metal and a minor promoting amount of an organic compound capable of reacting with a portion of said free alkali metal to form a metallized organic compound.

A further embodiment of the present invention relates to the alkylation of an alkylatable cyclic paraffin hydrocarbon with an olefin-acting compound at alkylating conditions in the presence of a catalyst comprising a free alkali metal and a minor promoting amount of an organic compound capable of reacting with a portion of said free alkali metal to form a metallized organic compound.

A still further embodiment of this invention relates to the alkylation of an isoparaffinic hydrocarbon with an olefin-acting compound at alkylating conditions in the presence of a catalyst comprising a free alkali metal and a minor promoting amount of an organic compound capable of reacting with a portion of said free alkali metal to form a metallized organic compound.

A specific embodiment of the present invention relates to the alkylation of isobutane with propylene at alkylating conditions in the presence of a catalyst comprising sodium and a minor promoting amount of an acetylenic hydrocarbon capable of reacting with a portion of said free sodium to form a sodium acetylide.

Another specific embodiment of the present invention relates to a process for the alkylation of isobutane with propylene in the presence of a catalyst comprising sodium and a minor promoting amount of an organic compound capable of reacting with a portion of said free sodium and represented by the formula RX wherein R is a member of the group consisting of alkyl, alkenyl, cycloalkyl, aralkyl, aryl, and alkaryl radicals and X is selected from the group consisting of a halogen atom, a hydroxyl group, a carboxylic acid group, an alkoxy group, a nitro group, and a cyano group.

A still further specific embodiment of the present invention relates to the alkylation of isobutane with propylene at alkylating conditions in the presence of a catalyst comprising sodium and a minor promoting amount of a polycyclic hydrocarbon capable of reacting with a portion of said free sodium.

An additional specific embodiment of the present invention relates to the alkylation of isobutane with propylene at alkylating conditions in the presence of a catalyst comprising sodium and a minor promoting amount of an organic peroxy compound capable of reacting with a portion of said free sodium to form a metallized organic compound.

Other embodiments of the present invention will become apparent in considering the specifications as hereinafter set forth.

Catalysts which are useful in this process include alkali metals and minor promoting amounts of organic compounds capable of reaction with a portion of the alkali metal to form a metallized organic compound. Of the alkali metal (lithium, sodium, potassium, rubidium, and cesium) the more plentiful sodium and potassium are generally preferred, and particularly sodium because of its relatively low cost. These alkali metals are utilized together with one or more organic compounds capable of reacting with a portion of the alkali metal to form a metallized organic compound. Such organic compounds utilizable in the process of this invention along with the alkali metal can be termed alkali metal promoters and include diolefinic and acetylenic hydrocarbons, polycyclic hydrocarbons, organic peroxy compounds, and organic compounds represented by the formula RX wherein R is selected from the group consisting of alkyl, alkenyl, cycloalkyl, aralkyl, aryl, and alkaryl, and X is selected from the group consisting of a halogen atom, a hydroxyl group, a carboxylic acid group, an alkoxyl group, a nitro group, and a cyano group. Suitable acetylenic hydrocarbon promoters include acetylene, methylacetylene, ethylacetylene, pentine, hexine, heptine, and also other acetylenic hydrocarbons containing the —C≡CH group. Suitable polycyclic hydrocarbon promoters include polynuclear aromatic hydrocarbons such as anthracene, dihydroanthracene, phenanthrene, fluorene, and the like. Other suitable polycyclic hydrocarbons include tetralin, diphenylmethane, o-diphenylbenzene, etc. Suitable organic peroxy compound promoters which are useful as catalyst components in this process include acetyl peroxide, benzoyl peroxide, ascaridol, di-tert-butyl peroxide, and also various hydrocarbons hydroperoxides such as tert-butyl hydroperoxide, tetralin hydroperoxide, methylcyclopentyl hydroperoxide, dimethylcyclopentyl hydroperoxide and various other hydroperoxides and peroxides which are formed by oxidation of the olefinic and paraffinic hydrocarbons as well as certain aromatic and naphthenic hydrocarbons.

Utilizable promoters also include organic compounds which can be represented by the formula RX wherein R is a member of the group consisting of alkyl, alkenyl, cycloalkyl, aralkyl, aryl, and alkaryl radicals, and X is selected from the group consisting of a halogen atom, a hydroxyl group, carboxylic acid group, an alkoxy group, a nitro group, and a cyano group. The RX compounds thus include organic halides, particularly organic chlorides, alcohols, particularly branch chain alcohols, phenols, carboxylic acids, ethers, alkoxy aromatic compounds, nitro aromatic hydrocarbons, nitro alkanes, cyanoalkanes, and aromatic cyano compounds. Examples of suitable RX compounds include ethyl chloride, ethyl bromide, n-propyl chloride, isopropyl chloride, n-butyl chloride, isobutyl chloride, sec-butyl chloride, tert-butyl chloride, allyl chloride, benzyl chloride, tolyl chloride, tolyl bromide, cyclohexyl fluoride, 1,1-dichloro-3,3-dimethylbutane, etc., n-propyl alcohol, isopropyl alcohol, n-butyl alcohol, isobutyl alcohol, sec-butyl alcohol, tert-butyl alcohol, cyclohexanol, allyl alcohol, benzyl alcohol, triphenyl carbinol, phenol, and various alkyl phenols including cresol, xylenols, etc., benzoic acid, toluic acid, nitrobenzene, isopropyl nitrate, nitrotoluene, phenyl cyanide, anisole, p-methoxy-toluene, m-methoxy-toluene, etc.

While the catalyst of the present invention includes an alkali metal, the catalyst comprising free alkali metal and a minor promoting amount of an organic compound capable of reacting with a portion of the free alkali metal possesses properties superior to those of an alkali metal alone. Also, as will be illustrated in the examples appended to the present specification, the catalyst of the present invention gives results different from the results obtained by acid or free radical type catalysts or by use of purely thermal conditions. For example, the products formed in the alkylation of paraffin hydrocarbons reaction are different from those obtained by previous methods.

As hereinabove set forth the present invention relates to a process for the alkylation of an alkylatable paraffin hydrocarbon with an olefin-acting compound at alkylating conditions in the presence of a catalyst comprising a free alkali metal and a minor promoting amount of an organic compound capable of reacting with a portion of said free alkali metal to form a metallized organic compound. Many paraffin hydrocarbons are utilizable as starting materials. Preferred paraffin hydrocarbons are the isoparaffins and naphthenic hydrocarbons containing one or more alkyl groups. Suitable paraffin hydrocarbons include butane, isobutane, hexane, 2-methylpentane, 3-methylpentane, 2,3-dimethylbutane, n-heptane, 2-methylheptane, 3-methylheptane, etc. Cyclic paraffin hydrocarbons utilizable as starting materials include methylcyclopentane, cyclohexane, methylcyclohexane, etc.

Isobutane is the isoparaffin commonly subjected to alkylation commercially, although higher molecular weight isoparaffins also react with olefin-acting compounds under similar or modified conditions of operation to produce branched chain paraffinic hydrocarbons of higher boiling point than the isoparaffinic hydrocarbons charged to the process. However, as the higher molecular weight isoparaffins such as isopentane, isohexane, etc. are themselves valuable constituents of gasoline, they are consequently used less commonly than isobutane as charging stock for the alkylation process. Of the various naphthenic hydrocarbons which may be alkylated in the presence of the catalyst described herein to produce naphthenic hydrocarbons of more highly branched chain structures, methylcyclopentane and its alkyl derivatives are commonly employed in such alkylation; however, cyclopentane and cyclohexane as well as alkyl derivatives of cyclohexane may also be utilized to advantage. The resulting alkylates are utilizable as constituents for high antiknock gasoline.

Suitable alkylating agents which may be charged in this process are olefin-acting compounds, namely, monoolefins. Monoolefins which may be utilized for alkylating paraffin hydrocarbons in the presence of a catalyst comprising a free alkali metal and a minor promoting amount of an organic compound capable of reacting with a portion of said free alkali metals to form a metallized organic compound include either normally gaseous or normally liquid olefins such as ethylene, propylene, 1-butene, 2-butene, isobutene, pentenes, and higher normally liquid olefins, the latter including various olefin polymers having from about 6 to about 18 carbon atoms per molecule. Cycloolefins such as cyclopentene, cyclohexene, and various alkyl cycloolefins may also be utilized but generally not under the same conditions of operation applying to the noncyclic olefins.

In accordance with the process of the present invention the alkylation of paraffin hydrocarbons reaction to produce hydrocarbons of more highly branched chain structure and of higher molecular weight than the hydrocarbons charged to the process is effected in the presence of the above indicated catalyst at a temperature of from about 100° to about 400° C., and preferably from about 250 to about 350° C. although the exact temperature needed for a particular paraffin alkylation reaction will depend upon the specific reactants employed.

Better contacting of the reactants and the catalyst and improved yields of desired products is sometimes effected by mixing the free alkali metal and organic compound capable of reacting with a portion of said free alkali metal with a catalyst supporting or spacing material such as activated charcoal. Also, granular coke, silica, alumina, brass, porcelain, quartz, etc., steel turnings, cooper shot, etc., which do not have an adverse influence on the reaction but improve the mixing may be used. Such spacing materials are useful in either batch type operation as in an autoclave or in continuous treatment in a tubular reactor or other suitable apparatus. When the stirring or mixing of the reactants and catalyst is very thorough and efficient, the process may be carried out at temperatures within the lower part of the range hereinabove specified. The alkylation reaction is usually carried out at a pressure of from about atmospheric to about 150 atmospheres or more. Pressures of greater than 50 atmospheres are often unnecessary and temperatures greater than about 350° C. will seldom be needed. The operating temperature and pressure will depend upon the paraffinic and olefinic hydrocarbons charged and the ratios present in the reaction zone as well as upon the catalyst present therein. In the hydrocarbon mixture subjected to alkylation, it is preferable to have present from about 2 to about 10 or more, sometimes up to 20, and sometimes even up to 100 or more, molecular proportions of alkylatable paraffin hydrocarbons per molecular proportion of olefin-acting compound introduced thereto, particularly olefin hydrocarbon. The higher molecular ratios of alkylatable paraffin hydrocarbon to olefin tend to reduce polymerization of the olefins, particularly lower molecular weight olefins, and to reduce the formation of polyalkylated products because of the operation of the law of mass action under these conditions.

The amount of free alkali metal used in the process is dependent upon the nature and reactivity of the paraffinic hydrocarbon undergoing alkylation and upon the nature of the olefin used as the alkylating agent. It has been found that rather large amounts of free alkali metal are desirable, particularly when the reaction is carried out under conditions which do not assure thorough mixing. It is preferred to use greater than about 2% by weight of free alkali metal based on the paraffinic hydrocarbon reactant. The necessary amount of organic compound capable of reacting with a portion of the free alkali metal to form a metallized organic compound has been determined as the mole ratio of free alkali metal to organic compound promoter, a mole ratio of free alkali metal to promoter greater than one is always desirable; mole ratios of free alkali metal to promoter of greater than 5 are preferred, and better results have been obtained when this mole ratio is 10:1 or higher. This of course means that when the percentage by weight of free alkali metal based on the paraffinic hydrocarbon reactant is fixed, smaller amounts of organic compound promoters are more desirable than larger amounts. The larger amounts result in lower mole ratios as hereinabove set forth. In the resultant catalyst mixture, the alkali metal is always present in an amount such that more than one atomic proportion of free alkali metal is present per molecular proportion of organic compound utilized as a catalyst promoter.

In converting paraffin hydrocarbons to effect alkylation thereof with the type of catalyst herein described, either batch or continuous operations may be employed. The actual operation of the process admits of some modification depending upon the normal phase of the reacting constituents and whether batch or continuous operations are employed. In a sample type of batch operation a praffinic hydrocarbon to be alkylated, such as, for example, isobutane, is brought to a temperature within the approximate range specified in the presence of a catalyst comprising sodium and a minor promoting amount of, for example, anthracene; and alkylation of the paraffin hydrocarbon is effected by the gradual introduction under pressure of an olefin such as, for example, propylene in a manner to attain contact between catalyst and reacting compounds. The product of this reaction is 2,2,3-trimethyl-butane or triptane, as hereinabove described, instead of the expected mixture of 2,3- and 2,4-dimethylpentane usually obtained with acid catalysts.

In another method of operation, the paraffinic hydrocarbon may be mixed with an olefin at a suitable temperature, a catalyst comprising sodium and a minor amount of an alkyl halide promoter, such as tert-butyl chloride, is added and the reaction of alkylation induced by sufficiently long contact with the catalyst. Alkylation may be allowed to progress to different stages depending upon contact time. In the case of alkylation of isobutane with normally gaseous olefins, the best products from the standpoint of motor fuel quality usually are produced by the condensation of equimolecular quantities of paraffinic hydrocarbons and olefins. After a batch treatment, the alkali metal component of the catalyst is removed in any suitable manner, such as by destruction of its activity by the addition of a suitable quantity of an alcohol, and the hydrocarbon fraction or layer is then removed, by decantation in some instances, and subjected to fractionation for the recovery of an intermediate boiling range motor fuel fraction.

In one type of continuous operation, a liquid isoparaffin containing dissolved therein a requisite amount of alkali metal and promoter therefor may be pumped around a circuit in a cyclic type reactor system. The olefin-acting compound may be added to the isoparaffin stream as such or may be admixed with additional isoparaffin and introduced in relatively small quantities at various points in the cyclic reactor system. It is also within the scope of the present invention to add the alkali metal component and/or promoter of the present invention continuously or intermittently. In some cases, only sufficient free alkali metal and promoter to form the desired catalyst in situ is necessary. In such an operation the original paraffin hydrocarbon stream such as isobutane may contain sufficient dissolved sodium and promoter to form the desired catalyst in situ, although the paraffin hydrocarbon stream can be utilized without prior contact or combination with free alkali metal. It is also within the scope of this invention to add minor amounts of promoter continuously as may be necessary to maintain catalyst activity at the desired level. In such a cyclic type of reactor system, the mixture of catalyst and saturated hydrocarbons is rapidly recycled and thus isoparaffin to olefin ratios of 100 to 1,000 to 1 or higher may be attained as is desired. The details of continuous processes of this general character are familiar to those skilled in refinery operations and any necessary additions or modifications of the above general procedures will be more or less obvious and can be made without departing from the generally broad scope of the invention.

The process of the present invention is illustrated by the following examples which are introduced for the purpose of illustration and with no intention of unduly limiting the generally broad scope of the present invention.

EXAMPLE I

A glass lined rotatable steel autoclave of 850 cc. capacity is charged with 58 grams of isobutane and 10 grams of sodium. The autoclave is then closed and 10.5 grams of propylene is introduced thereto. The autoclave containing the isobutane, sodium, and propylene is then rotated and heated for four hours at a temperature of 200–325° C. after which the autoclave is permitted to cool to room temperature. After the pressure on the autoclave has been released, samples of the gas are taken for analyses. On opening the autoclave, little or no liquid product is noted, the sodium utilized being found in the glass liner. Ethyl alcohol is then added to the glass liner in an amount sufficient to destroy the sodium and no hydrocarbon layer is noted. As can be seen, alkylation of isobutane with propylene in the presence of sodium alone as the catalyst does not occur. No 2,2,3-trimethylbutane is observed as the product.

EXAMPLE II

A glass-lined rotatable steel autoclave of 850 cc. capacity is charged with 58 grams of isobutane, 10.5 grams of propylene, 7.6 grams of sodium, and 5.5 grams of 1-heptine. The autoclave is closed, after which the autoclave and its contents are heated at a temperature of 275–300° C. for a time of 4.5 hours. After the reaction, it is found that 50 mole percent of the propylene has reacted to from $C_7$ hydrocarbons which yields slightly greater than 12 grams of liquid product. This product is saturated and consists principally of 2,2,3-trimethylbutane.

EXAMPLE III

A glass-lined rotatable steel autoclave of 850 cc. capacity is charged with 58 grams of isobutane, 10.5 grams of propylene, 6–10 grams of sodium, and 2 grams of an alcohol. The autoclave is rotated and heated at a temperature of from about 275 to 315° C. for a time of from 4 to about 5 hours. The alcohols employed are shown in the following Table I:

*Table I*

EFFECT OF ALCOHOLS ON THE ALKYLATION OF ISOBUTANE WITH PROPYLENE IN THE PRESENCE OF SODIUM

| Run No. | Alcohol | | Sodium, Grams | Duration, Hours |
|---|---|---|---|---|
| | Kind | Grams | | |
| 1 | sec-butyl | 2 | 7.4 | 5 |
| 2 | isobutyl | 2 | 7.2 | 4.2 |
| 3 | tert-butyl | 2 | 6.8 | 4.5 |
| 4 | cyclohexyl | 2 | 7.2 | 5 |
| 5 | allyl | 2 | 7.2 | 4.5 |
| 6 | benzyl | 2 | 7.2 | 3.5 |
| 7 | triphenylmethyl | 3 | 7.0 | 5 |

Saturated liquid product is obtained from each of the above runs and comprises substantially pure 2,2,3-trimethylbutane.

From the above experiments it is noted that 2,3- and 2,4-dimethylpentane are not observed in the product, indicating a new and unexpected type of alkylation reaction.

EXAMPLE IV

Essentially the same procedure is employed as in the preceding examples. The glass-lined autoclave of 850 cc. capacity is charged with 58 grams of isobutane, 10.5 grams of propylene, 7.0 grams of sodium, and 2 grams of nitrobenzene. After closure the charged autoclave is then rotated and heated at a temperature of about 300° C. for a time of about 5 hours. On working up the liquid product, the $C_7$ fraction is found to be mainly 2,2,3-trimethylbutane.

EXAMPLE V

In another run, 58 grams of isobutane, 10.5 grams of propylene, 7.0 grams of sodium, and 3.4 grams of isoamyl nitrate are reacted in a rotating steel autoclave at a temperature of 325° C. for a time of 5 hours. Again 2,2,3-trimethylbutane is the main reaction product.

EXAMPLE VI

Essentially the same procedure as used in the preceding runs is employed in an additional four runs. In the runs, 58 grams of isobutane, 10.5 grams of propylene, 7.4 grams (0.34 mole) of sodium and 0.02 mole of m-cresol, o-toluic acid, m-methoxytoluene, and isovaleric acid, respectively, are charged to the autoclave. Alkylation is obtained in each base, o-toluic acid apparently being the most active promoter. From the saturated hydrocarbon liquid product, 2,2,3-trimethylbutane is identified as the main portion of the $C_7$ fraction.

EXAMPLE VII

In another run, using the same procedure as used in the preceding examples, isobutane is reacted with propylene in the presence of sodium and a minor promoting amount of benzonitrile. Here again, 2,3,3-trimethylbutane is the main reaction product.

EXAMPLE VIII

To evaluate the effect of polycyclic hydrocarbon catalyst promoters, several runs are made in which 1.0 mole of isobutane and 0.25 mole of propylene are reacted in the presence of sodium and in each case a different polycyclic hydrocarbon. The data are summarized in the following Table II:

*Table II*

EFFECT OF POLYCYCLIC HYDROCARBON CATALYST PROMOTERS ON THE ALKYLATION OF ISOBUTANE WITH PROPYLENE IN THE PRESENCE OF FREE SODIUM

| Run Number | 8 | 9 | 10 | 11 | 12 | 13 | 14 |
|---|---|---|---|---|---|---|---|
| Isobutane: | | | | | | | |
| Grams | 58 | 58 | 58 | 58 | 58 | 58 | 58. |
| Moles | 1 | 1 | 1 | 1 | 1 | 1 | 1. |
| Propylene: | | | | | | | |
| Grams | 10.5 | 10.5 | 10.5 | 10.5 | 10.5 | 10.5 | 10.5. |
| Moles | 0.25 | 0.25 | 0.25 | 0.25 | 0.25 | 0.25 | 0.25. |
| Sodium: | | | | | | | |
| Grams | 10 | 7.0 | 5 | 5.2 | 6 | 7.6 | 7.0. |
| Moles | 0.44 | 0.30 | 0.22 | 0.22 | 0.26 | 0.32 | 0.30. |
| Promoter | anthracene | dihydro-anthracene | fluorene | phenan-threne | tetralin | diphenly-methane | o-diphen-ylbenzene. |
| Grams | 4 | 2 | 2 | 2 | 2 | 3.4 | 2.2. |
| Moles | 0.02 | 0.01 | 0.01 | 0.01 | 0.02 | 0.02 | 0.02. |
| Temperature, °C | 325 | 325 | 325 | 325 | 325 | 325 | 325. |
| Duration, hours | 5 | 5 | 5 | 5 | 5 | 5 | 5. |

In the saturated liquid hydrocarbon product from each of the above runs, substantially pure 2,2,3-trimethylbutane is observed and isolated.

EXAMPLE IX

In a manner similar to that described above, 1 mole of isobutane is charged to a rotatable steel autoclave along with 0.25 mole of 1-butene, 10.0 grams of sodium, and 4 grams of anthracene. After heating and rotating for 5 hours at 300° C., 2,2,3-trimethylpentane is isolated from the liquid reaction product.

EXAMPLE X

Essentially the same procedure as described in Example I is used in the following runs in order to evaluate various organic halides. An outline of the runs is presented in the following Table III:

*Table III*

EFFECT OF ORGANIC HALIDES ON THE ALKYLATION OF ISOBUTANE WITH PROPYLENE IN THE PRESENCE OF FREE SODIUM

| Run No. | Organic Halide | | Sodium, Grams | Duration, Hours |
|---|---|---|---|---|
| | Kind | Grams | | |
| 15 | ethyl bromide | 2 | 7.6 | 5 |
| 16 | allyl chloride | 2 | 7.8 | 5 |
| 17 | n-butyl chloride | 5 | 7.8 | 3 |
| 18 | isobutyl chloride | 2 | 7.2 | 4 |
| 19 | sec-butyl chloride | 2 | 7.0 | 4 |
| 20 | tert-butyl chloride | 2 | 6.4 | 4 |
| 21 | 1,1-dichloro-3,3-dimethylbutane | 3.6 | 7.4 | 4 |
| 22 | o-chlorotoluene | 2 | 7.8 | 5 |
| 23 | o-bromotoluene | 2 | 7.4 | 3 |
| 24 | cyclohexyl fluoride | 2 | 7.6 | 6 |

In each of the above experiments, 1 mole of isobutane and 0.25 mole of propylene is charged to the rotatable autoclave along with the catalyst and the temperatures utilized range from 275–325° C. 2,2,3-trimethylbutane is observed in the saturated liquid hydrocarbon product from each experiment.

EXAMPLE XI

A glass-lined rotatable steel autoclave of 850 cc. capacity is charged with 58 grams of isobutane, 10.5 grams of propylene, 6.6 grams of sodium, and 2 grams of di-tert-butylperoxide after which the autoclave is closed. The autoclave and its contents are then heated at a temperature of 275–325° C. for a time of 4 hours. After the autoclave and reaction mixture are cooled to room temperature, the product is removed, filtered to remove sodium, and the filtrate distilled and inspected for the presence of 2,2,3-trimethylbutane. A substantial quantity of this compound is found in the saturated liquid product.

EXAMPLE XII

In a manner similar to that described in Example XI, 3.2 grams of cumene hydroperoxide is substituted for the di-tert-butyl peroxide of Example XI. The product from this reaction again contains 2,2,3-trimethylbutane.

Samples of the saturated $C_7$ hydrocarbon fractions from each of the above experiments are combined so that a sufficient quantity of $C_7$ fraction is available for microoctane number determinations. 2,2,3-trimethylbutane has a research octane number (F-1 clear) of isooctane plus 1.8 cc. of TEL. The combined samples from the above described experiments have a research octane number of isooctane plus 1.5 cc. of TEL.

We claim as our invention:

1. A process for the alkylation of an alkylatable saturated hydrocarbon with an olefin-acting compound at alkylating conditions in the presence of a catalyst comprising a free alkali metal and a minor promoting amount of an organic compound capable of reacting with a portion of said free alkali metal to form a metallized organic compound.

2. A process for the alkylation of an alkylatable acyclic paraffin hydrocarbon with an olefin-acting compound at alkylating conditions in the presence of a catalyst comprising a free alkali metal and a minor promoting amount of an organic compound capable of reacting with a portion of said free alkali metal to form a metallized organic compound.

3. A process for the alkylation of an alkylatable cyclic parafin hydrocarbon with an olefin-acting compound at alkylating conditions in the presence of a catalyst comprising a free alkali metal and a minor promoting amount of an organic compound capable of reacting with a portion of said free alkali metal to form a metallized organic compound.

4. A process for the alkylation of an isoparaffinic hydrocarbon with an olefin-acting compound at alkylating conditions in the presence of a catalyst comprising a free alkali metal and a minor promoting amount of an organic compound capable of reacting with a portion of said free alkali metal to form a metallized organic compound.

5. A process for the alkylation of an alkylatable saturated hydrocarbon with an olefin-acting compound at alkylating conditions in the presence of a catalyst comprising sodium and a minor promoting amount of an organic compound capable of reacting with a portion of said sodium to form a metallized organic compound.

6. A process for the alkylation of an alkylatable acyclic paraffin hydrocarbon with an olefin-acting compound at alkylating conditions in the presence of a catalyst comprising sodium and a minor promoting amount of an organic compound capable of reacting with a portion of said sodium to form a metallized organic compound.

7. A process for the alkylation of an alkylatable cyclic paraffin hydrocarbon with an olefin-acting compound at alkylating conditions in the presence of a catalyst comprising sodium and a minor promoting amount of an organic compound capable of reacting with a portion of said sodium to form a metallized compound.

8. A process for the alkylation of an isoparaffinic hydrocarbon with an olefin-acting compound at alkylating conditions in the presence of a catalyst comprising sodium and a minor promoting amount of an organic compound capable of reacting with a portion of said sodium to form a metallized organic compound.

9. A process for the alkylation of an isoparaffinic hydrocarbon with an olefinic hydrocarbon at alkylating conditions in the presence of a catalyst comprising a free alkali metal and a minor promoting amount of an acetylenic hydrocarbon capable of reacting with a portion of said free alkali metal to form a metallized acetylenic compound.

10. A process for the alkylation of an isoparaffinic hydrocarbon with an olefinic hydrocarbon at alkylating conditions in the presence of a catalyst comprising sodium and a minor promoting amount of an acetylenic hydrocarbon capable of reacting with a portion of said sodium to form sodium acetylide.

11. A process for the alkylation of an isoparaffinic hydrocarbon with an olefinic hydrocarbon at alkylating conditions in the presence of a catalyst comprising a free alkali metal and a minor promoting amount of an organic compound capable of reacting with a portion of said free sodium and represented by the formula RX wherein R is a member of the group consisting of alkyl, alkenyl, cycloalkyl, aralkyl, aryl, and alkaryl radicals and X is selected from the group consisting of a halogen atom, a hydroxyl group, a carboxylic acid group, an alkoxy group, a nitro group, and a cyano group.

12. A process for the alkylation of an isoparaffin hydrocarbon with an olefinic hydrocarbon at alkylating conditions in the presence of a catalyst comprising sodium and a minor promoting amount of an organic compound capable of reacting with a portion of said sodium and represented by the formula RX where R is a member of the group consisting of alkyl, alkenyl, cycloalkyl, aralkyl, aryl, and alkaryl radicals and X is selected from the group consisting of a halogen atom, a hydroxyl group, a carboxylic acid group, an alkoxy group, a nitro group, and a cyano group.

13. A process for the alkylation of an isoparaffin hydrocarbon with an olefinic hydrocarbon at alkylating conditions in the presence of a catalyst comprising a free alkali metal and a minor promoting amount of a polycyclic hydrocarbon capable of reacting with a portion of said free alkali metal to form a metallized organic compound.

14. A process for the alkylation of an isoparaffin hydrocarbon with an olefinic hydrocarbon at alkylating conditions in the presence of a catalyst comprising sodium and a minor promoting amount of a polycyclic hydrocarbon capable of reacting with a portion of said free sodium to form a metallized polycyclic hydrocarbon.

15. A process for the alkylation of an isoparaffin hydrocarbon with an olefin hydrocarbon at alkylating conditions in the presence of a catalyst comprising a free alkali metal and a minor promoting amount of an organic peroxy compound capable of reacting with a portion of said free alkali metal to form a metallized organic compound.

16. A process for the alkylation of an isoparaffinic hydrocarbon with an olefinic hydrocarbon at alkylating conditions in the presence of a catalyst comprising sodium and a minor promoting amount of an organic peroxy compound capable of reacting with a portion of said free sodium to form a metallized organic compound.

17. A process for the alkylation of isobutane with propylene at alkylating conditions in the presence of a catalyst comprising sodium and a minor promoting amount of an acetylenic hydrocarbon capable of reacting with a portion of said free sodium to form a sodium acetylide.

18. A process for the alkylation of isobutane with propylene at alkylating conditions in the presence of a catalyst comprising sodium and a minor promoting amount of an organic compound capable of reacting with a portion of said free sodium and represented by the formula RX wherein R is a member of the group consisting of alkyl, alkenyl, cycloalkyl, aralkyl, aryl, and alkaryl radicals and X is selected from the group consisting of a halogen atom, a hydroxyl group, a carboxylic acid group, an alkoxy group, a nitro group, and a cyano group.

19. A process for the alkylation of isobutane with propylene at alkylating conditions in the presence of a catalyst comprising sodium and a minor promoting amount of a polycyclic hydrocarbon capable of reacting with a portion of said free sodium.

20. A process for the alkylation of isobutane with propylene at alkylating conditions in the presence of a catalyst comprising sodium and a minor promoting amount of an organic peroxy compound capable of reacting with a portion of said free sodium to form a metallized organic compound.

References Cited in the file of this patent

UNITED STATES PATENTS

| | | |
|---|---|---|
| 2,361,356 | Sachanen et al. | Oct. 24, 1944 |
| 2,365,860 | Bradley et al. | Dec. 26, 1944 |
| 2,721,886 | Pines et al. | Oct. 25, 1955 |
| 2,728,802 | Closson et al. | Dec. 27, 1955 |
| 2,748,178 | Pines et al. | May 29, 1956 |